United States Patent
Flexer et al.

(10) Patent No.: US 8,111,166 B2
(45) Date of Patent: Feb. 7, 2012

(54) DEVICE, SYSTEM AND METHOD FOR MONITORING ANIMAL POSTURE PATTERN

(75) Inventors: Hagai Flexer, Kibbutz Gshor (IL); Eli Heimlich, Kiryat-Motzkin (IL)

(73) Assignee: S.A.E. Afikim Milking System Agricultural Cooperative Ltd., Kibbutz Afikim (IL)

( * ) Notice: Subject to any disclaimer, the term of this patent is extended or adjusted under 35 U.S.C. 154(b) by 534 days.

(21) Appl. No.: 12/149,576

(22) Filed: May 5, 2008

(65) Prior Publication Data

US 2008/0204255 A1    Aug. 28, 2008

Related U.S. Application Data

(63) Continuation-in-part of application No. PCT/IL2007/000148, filed on Feb. 5, 2007.

(60) Provisional application No. 60/924,315, filed on May 9, 2007.

(30) Foreign Application Priority Data

Feb. 8, 2006 (IL) .......................... 173604

(51) Int. Cl.
*G08B 23/00* (2006.01)
(52) U.S. Cl. ................ 340/573.7; 340/573.1; 340/573.3
(58) Field of Classification Search ............... 340/573.1, 340/573.7, 573.3
See application file for complete search history.

(56) References Cited

U.S. PATENT DOCUMENTS

| 1,915,267 | A | | 6/1933 | Bigelow |
| 4,667,188 | A | * | 5/1987 | Schwartz ...................... 340/689 |
| 5,006,676 | A | | 4/1991 | Bogut et al. |
| 6,104,294 | A | | 8/2000 | Andersson et al. |
| 6,115,679 | A | | 9/2000 | Rutter et al. |
| 6,129,686 | A | * | 10/2000 | Friedman ...................... 600/595 |
| 6,348,665 | B1 | | 2/2002 | Ohashi et al. |
| 6,536,377 | B2 | * | 3/2003 | Beaver ......................... 119/859 |
| 6,616,607 | B2 | | 9/2003 | Hashimoto et al. |
| 7,602,302 | B2 | * | 10/2009 | Hokuf et al. ............... 340/573.3 |
| 7,705,736 | B1 | * | 4/2010 | Kedziora ................... 340/573.3 |
| 2001/0050062 | A1 | | 12/2001 | Isley et al. |
| 2003/0069515 | A1 | | 4/2003 | Theelen et al. |
| 2004/0179194 | A1 | | 9/2004 | Schmilovitch et al. |
| 2006/0022833 | A1 | * | 2/2006 | Ferguson et al. ......... 340/573.1 |

(Continued)

FOREIGN PATENT DOCUMENTS

CN        200944242        9/2007

(Continued)

OTHER PUBLICATIONS

International Preliminary Report on Patentability Dated Aug. 14, 2009 From the International Preliminary Examining Authority Re.: Application No. PCT/IL2008/000710.

(Continued)

*Primary Examiner* — Travis Hunnings
(74) *Attorney, Agent, or Firm* — Pearl Cohen Zedek Latzer, LLP

(57) ABSTRACT

A device for determining a posture pattern of an animal comprises a housing configured and adapted to be attached to a part of the animal; the housing comprises a posture sensor operative to sense an orientation of the part of the animal indicating the posture of the animal; and an interface unit operative to output the orientation information.

34 Claims, 4 Drawing Sheets

U.S. PATENT DOCUMENTS

| | | | |
|---|---|---|---|
| 2008/0036610 A1* | 2/2008 | Hokuf et al. | 340/573.3 |
| 2008/0125670 A1 | 5/2008 | Signorini et al. | |
| 2008/0147458 A1 | 6/2008 | Yamazaki et al. | |
| 2008/0204255 A1 | 8/2008 | Flexer et al. | |
| 2009/0056637 A1 | 3/2009 | Gustafsson | |
| 2010/0030036 A1 | 2/2010 | Mottram et al. | |

FOREIGN PATENT DOCUMENTS

| | | |
|---|---|---|
| CN | 101114372 | 1/2008 |
| DE | 249974 | 9/1987 |
| DE | 4118168 | 1/1993 |
| DE | 69501446 | 8/1998 |
| DE | 69629869 | 7/2004 |
| DE | 202005015781 | 3/2006 |
| EP | 0743043 | 11/1996 |
| EP | 0808567 | 11/1997 |
| EP | 1000535 | 5/2000 |
| EP | 1169917 | 1/2002 |
| EP | 1191325 | 3/2002 |
| EP | 1191326 | 3/2002 |
| EP | 1199027 | 4/2002 |
| EP | 1212939 | 6/2002 |
| EP | 1839621 | 10/2007 |
| FR | 2759541 | 8/1998 |
| FR | 2878430 | 6/2006 |
| GB | 2221161 | 1/1990 |
| GB | 2257886 | 1/1993 |
| IE | 20040051 | 9/2005 |
| JP | 06-141385 | 5/1994 |
| JP | 10-295212 | 11/1998 |
| JP | 2003-189751 | 7/2003 |
| JP | 2004-275124 | 7/2004 |
| JP | 2004-337093 | 12/2004 |
| JP | 2006-075090 | 3/2006 |
| JP | 2008-022760 | 2/2008 |
| JP | 2010-033329 | 2/2010 |
| RU | 2060499 | 6/1996 |
| WO | WO 00/33028 | 6/2000 |
| WO | WO 01/19170 | 3/2001 |
| WO | WO 2004/066720 | 8/2004 |
| WO | WO 2005/067702 | 7/2005 |
| WO | WO 2007/091246 | 8/2007 |
| WO | WO2007/091246 | 8/2008 |
| WO | WO 2008/124481 | 10/2008 |
| WO | WO 2008/146276 | 12/2008 |
| WO | WO 2010/066429 | 6/2010 |
| WO | WO 2010/099800 | 9/2010 |

OTHER PUBLICATIONS

Eizenbod et al. Article in Hebrew "Developments in Recognition of Estrus in Cows", Research and Deed, 9: 39-43, 1987. Abstract.

Esslemont et al. "Oestrous Behaviour in a Herd of Dairy Cows", The Veterinary Record, 99: 472-475, 1976.

Livshin et al. "Lying Behaviour of Dairy Cows Under Different Housing Systems and Physiological Conditions", Proc. Implementation of Precision Agriculture, 2nd ECPLF, Jun. 9-12, Uppsala, Sweden: 305-311, 2005.

Schofield "Oestrus Detection Methods and Oestrous Behaviour of Dairy Cows in Different Environments", Dissertation Abstracts International B, Sciences and Engineering, 49: 2432, 1989. Abstract.

Preliminary Amendment Dated Jan. 11, 2010 From the US Patent and Trademark Office Re.: U.S. Appl. No. 12/149,576.

Summary of Official Action Dated Mar. 30, 2010 From the Patent Office of the Russian Federation Re.: Application No. 2009-7024590.

Office Action Dated Dec. 14, 2009 From the Israeli Patent Office Re.: Application No. 173604 and Its Translation Into English.

Interantional Search Report Dated Oct. 2, 2008 From the International Searching Authority Re.: Application No. PCT/IL2008/000613.

International Search Report Dated Oct. 2, 2008 From the International Searching Authority Re.: Application No. PCT/IL2008/000710.

Written Opinion Dated Oct. 2, 2008 From the International Searching Authority Re.: Application No. PCT/IL2008/000613.

Written Opinion Dated Oct. 2, 2008 From the International Searching Authority Re.: Application No. PCT/IL2008/000710.

Supplementary European Search Report and the European Search Opinion Dated Jul. 6, 2010 From the European Patent Office Re. Application No. 06733333.6.

Response Dated Jun. 22, 2010 to Summary of Official Action of Mar. 30, 2010 From the Patent Office of the Russian Federation Re.: Application No. 2009-7024590.

Office Action Dated Sep. 1, 2010 From the Israeli Patent Office Re.: Application No. 173604 and Its Translation Into English.

International Preliminary Report on Patentability Dated Mar. 10, 2009 From the International Bureau of WIPO Re.: Application No. PCT/IL2007/000148.

International Search Report Dated Oct. 29, 2008 From the International Searching Authority Re.: Application No. PCT/IL07/00148.

Office Action Dated May 14, 2009 From the Israeli Patent Office Re.: Application No. 173604 and Its Translation Into English.

Written Opinion Dated Oct. 29, 2008 From the International Searching Authority Re.: Application No. PCT/IL07/00148.

Response Dated May 13, 2010 to Office Action of Dec. 14, 2009 From the Israeli Patent Office Re.: Application No. 173604.

International Preliminary Report on Patentability Dated Aug. 14, 2009 From the International Preliminary Examining Authority Re.: Application No. PCT/IL2008/000710.

Livshin et al. "Lying Behaviour of Dairy Cows Under Different Housing Systems and Physiological Conditions", Proc. Implementation of Precision Agriculture, 2nd ECPLF, Jun. 9-12, Uppsala, Sweden: 305-311, 2005.

Purushottam "The Detection of Estrus in Dairy Cattle by Monitoring Behavioral Change in Stanchion Barn and Free Stall Housing".

Examination Report Dated May 24, 2011 From the Intellectual Property Office of New Zealand Re. Application No. 581254.

Translation of Office Action Dated May 11, 2011 From the State Intellectual Property Office of People's Republic of China Re. Application No. 200780004737.9.

Response Dated Mar. 29, 2011 to Office Action of Sep. 1, 2010 From the Israeli Patent Office Re.: Application No. 173604.

Communication Pursuant to Rules 70(2) and 70a(2) EPC Dated May 9, 2011 From the European Patent Office Re. Application No. 07706091.1.

Examination Report Dated Oct. 11, 2010 From the Intellectual Property Office of New Zealand Re. Application No. 581254.

Examination Report Dated May 24, 2011 From the Intellectual Property Office of New Zealand Re. Application No. 581254.

International Search Report Dated Oct. 2, 2008 From the International Searching Authority Re.: Application No. PCT/IL2008/000613.

Response Dated Apr. 6, 2011 to Examination Report of Oct. 11, 2010 From the Intellectual Property Office of New Zealand Re. Application No. 581254.

Supplementary European Search Report and the European Search Opinion Dated Apr. 20, 2011 From the European Patent Office Re. Application No. 07706091.1.

Translation of Office Action Dated May 11, 2011 From the State Intellectual Property Office of People's Republic of China Re. Application No. 200780004737.9.

Eizenbod et al. Article in Hebrew "Developments in Recognition of Estrus in Cows", Research and Deed, 9: 39-43, 1987. Abstract.

Phatak "The Detection of Estrus in Dairy Cattle by Monitoring Behavioral Change in Stanchion Barn and Free Stall Housing", PhD Thesis Submitted to the faculty of the Graduate School of the University of Minnesota, 1982.

* cited by examiner

DEVICE, SYSTEM AND METHOD FOR MONITORING ANIMAL POSTURE PATTERN

RELATED APPLICATIONS

The present application is a continuation-in-part of PCT Patent Application No. PCT/IL2007/000148 filed on Feb. 5, 2007, which claims the benefit of priority of Israel Patent Application No. 173604 filed on Feb. 8, 2006. The present application also claims the benefit of priority under section 35 U.S.C. §119(e) of U.S. Provisional Patent Application No. 60/924,315 filed on May 9, 2007.

The present application is also related to U.S. Provisional Patent Application No. 60/924,316 filed on May 9, 2007 and entitled "Method for Predicting Calving".

FIELD OF THE INVENTION

The present invention relates to animal behavior sensing and more particularly to sensing behavioral patterns of domesticated farm animals.

BACKGROUND OF THE INVENTION

Sensors attached to animals to monitor behavioral patterns are known. Monitoring behavior patterns of animals may provide useful information regarding the well being of the animals. For example in the dairy industry, pedometers are often used and attached to a leg or the neck of dairy cows to monitor the number of animal movements of cows. Pedometers may typically include an accelerometer to measure impact in one or more directions, e.g. vertical impact. Monitoring the number of animal movements of the cows may aid in determining when the cow is in estrus so that the dairy manager may, for example plan an optimal time for insemination. The number of animal movements has been shown to increase during estrus. Number of animal movements may also be useful in monitoring the general well being of each of the cows and/or of the herd.

Other sensors to monitor animals are known. For example, sensors to monitor body temperatures of the animals are known. Body temperature sensors may typically be ingested.

Sensing devices may typically include an electronic identification (ID) tag that may be used to identify the animal, e.g. identify by serial number. The sensing devices may typically record and/or store information particular to the animal that may be periodically transmitted. Known sensing devices may typically be wireless devices, e.g. passive and/or active devices that may transmit data to a central transceiver unit when the animal comes within range of the transceiver.

SUMMARY OF THE INVENTION

An aspect of some embodiments of the invention is the provision of a posture sensing device to sense and monitor the laying pattern and/or the standing pattern of an animal either continuously and/or over a defined period of time. According to some embodiments of the present invention, the posture sensing device may include one or more posture sensors to sense the posture of the animal and a transmitting unit and/or transceiving unit to transmit data from the posture sensing device to a central receiving unit. According to some embodiments of the present invention, the posture sensing device may include a user interface unit and/or user output unit to convey data to the user, e.g. the dairy manager. According to some embodiments of the present invention, the sensing device may be structured to be attached to the animal, e.g. attached to the leg, neck, or ear of the animal.

According to some embodiments of the present invention, the sensing device includes a housing configured and adapted to be attached to a part of the animal. Typically, the housing includes a posture sensor operative to sense an orientation of the part of the animal indicating that the animal is laying down, and an interface unit operative to output the orientation information. According to some embodiments of the present invention, the posture sensing device may include one or more tilt switches to sense a change in inclination of a part of the animal above a defined threshold. According to one embodiment of the present invention, the posture sensing device may include a tip over switch, e.g. an omni-direction tip-over switch. According some embodiment of the present invention, the posture sensing device may be positioned on a leg of the animal, e.g. between the knee and the hoof, and the tilt switch may sense inclination and/or a change in inclination above a defined threshold, e.g. 60 degree threshold. According to some embodiments of the present invention, the defined threshold may correspond to an inclination that may be typical when the animal sustains a laying posture. Other thresholds may be used, for example other thresholds that may be suitable for sensors attached and/or mounted to other parts of the animal's body. The posture sensing device may include other sensors, e.g. accelerometers may be used to detect a change in the orientation and/or inclination of the animal indicating for example that the animal is laying down.

According to one embodiment of the present invention, the posture sensing device may include additional sensors, e.g. a sensor to monitor additional behavior patterns of the animal. According to another embodiment of the present invention, the posture sensing device may include an identification tag including identifying information to identify the animal and/or one or more details related to the animal.

An aspect of some embodiments of the invention is the provision of a posture sensing system to monitor the postural behavior of a plurality of animals. According to some embodiments of the present invention, the system includes at least one posture sensing device and a central processing unit that receives and processes information form the device. According to some embodiments of the present invention, the posture sensing system may include a central receiving and/or controlling unit operative to receive data from (and/or transmit to) one or more of the posture sensing devices, a processor operative to process the received data, a memory unit operative to store the received data, and a user interface unit to convey data, e.g. orientation information, to the user, e.g. the dairy manager. According to one embodiment of the present invention, the data may be transmitted by wireless transmission, e.g. radio frequency (RF) transmission, blue tooth, Infrared (IR), etc. Transmission may be continuous, e.g. in real time and/or episodic at one or more designated locations, e.g. a stall, feeding station, and/or milking station, when the animal passes by the designated location, for example once a day. In the case of episodic transmission, a central communication unit may transmit a signal to the posture sensing device requesting transmission of data. In reaction to such a command the posture sensing device may transmit data, e.g. data from an ID tag data and stored sensor data. Episodic transmission may be achieved by close range transmission using, for example RF transmission, IR transmission, Blue-Tooth transmission, and/or by hardwire connection.

An aspect of some embodiments of the invention is a method for determining the laying posture pattern of an animal over a period of time. According to some embodiments of the invention, the method includes sensing a tilt of part of the animal above an operating angle, determining if the tilt is sustained for a first pre-defined period; and recording a laying posture status if the tilt is sustained for at least the pre-defined period. According to some embodiments of the present invention, the method may include detecting a laying posture event, determining the duration of each laying posture event, determining the time of each laying posture event, and determining the overall duration of the laying posture over a time period, e.g. over a 24 hour time period and/or over a time period since the last transmission of sensor data.

An exemplary embodiment of the present invention provides a device for determining a posture pattern of an animal comprising a housing configured and adapted to be attached to a part of the animal, the housing comprising a posture sensor operative to sense an orientation of the part of the animal indicating the posture of the animal, and an interface unit operative to output the orientation information.

Optionally, the posture sensor is operative to sense a tilt in the orientation of the part of the animal indicating that the animal is laying down.

Optionally the posture sensor includes a tilt switch to sense a tilt in orientation above an operating angle.

Optionally the posture sensor includes an omni-directional tilt switch to sense a tilt in orientation above an operating angle.

Optionally the posture sensor includes a tip-over switch to sense a tilt in orientation above an operating angle.

Optionally the operating angle is 60°.

Optionally the device comprises a controller operative to control output from the posture sensor, and a transmitter operative to transmit data from the posture sensor to a central communication unit.

Optionally the controller is operative to initiates an interrupt when the posture sensor senses a change in the orientation.

Optionally the controller is operative to determine a number of times the animal has assumed a laying posture.

Optionally the controller is operative to determine an overall time period that the animal has sustained a laying posture.

Optionally the controller is operative to determine a number of times the animal has assumed a standing posture.

Optionally the controller is operative to determine an overall time period that the animal has sustained a standing posture.

Optionally the controller includes an ID tag identifying the animal and is operative to transmit data from the ID tag.

Optionally the transmitter is an RF transmitter.

Optionally the transmitter is an IR transmitter.

Optionally the transmitter is a BlueTooth transmitter.

Optionally the transmitter includes a receiver to received data from a central communication unit.

Optionally the receiver is an RF receiver.

Optionally the device comprises a memory unit operative to store data from the posture sensor.

Optionally the device comprises a movement sensor operative to sense movement of the animal.

Optionally the interface unit comprises a display.

Optionally interface unit comprises audio output.

Optionally the controller is operative to control transmission of data in response to a wake-up signal received from a central communication unit.

An exemplary embodiment of the present invention provides a system for determining a posture pattern of animals comprising at least one posture sensing device, and a central processing unit that receives and processes information from the device.

Optionally the system includes a central communication unit comprising a central receiver to receive data from one or more devices.

Optionally the central communication unit includes a central transmitter operative to transmit a signal to the device.

Optionally the central transmitter is operative to transmit a signal to the device, wherein the signal is operative to wake-up the device.

Optionally the central receiver is a RF receiver.

Optionally the central communication unit is configured to communicate with the device at a range of approximately 30 cm or less.

Optionally the central processing unit comprises a central processor operative to process data received from the at least one device, a central memory operative to store data received from the at least one device, a central interface unit operative to relay information to a user regarding the data received from the at least one device, and a user input operative to input user commands to the central processing unit.

Optionally the central processing unit includes a personal computer operative to communicate with the central communication unit and to process data received from the central communication unit.

Optionally the system comprises a plurality of central communication units in communication with a single central processing unit.

Optionally the central processing unit comprises a display for displaying data corresponding to a laying pattern of the animals.

An exemplary embodiment of the present invention provides a method for determining a posture pattern of an animal, the method comprising sensing a tilt of part of the animal above an operating angle, determining if the tilt is sustained for a first pre-defined period, and recording a laying posture status if the tilt is sustained for at least the pre-defined period.

Optionally the pre-defined period is 3 minutes.

Optionally the method comprises determining if the tilt is sustained for less than the first pre-defined period, and recording a motion status if the tilt is sustained for less than the pre-defined period.

Optionally the method comprises sensing a tilt of the animal that is below the operating angle, ending the laying posture status upon sensing the posture of an animal that is below the operating angle, and recording a time period during which a laying posture status is maintained.

Optionally the method comprises determining if the tilt of the animal below the operating angle is sustained for a second pre-defined period, and recording a standing posture status if the tilt below the operating angle is sustained for at least second pre-defined period.

Optionally the second pre-defined period is 1 minute.

Optionally the method comprises determining if the tilt of the animal below the operating angle is sustained for less than the second pre-defined period and recording a motion status if the tilt below the operating angle is sustained for less than the second pre-defined period.

BRIEF DESCRIPTION OF THE DRAWINGS

The subject matter regarded is particularly and distinctly claimed in the concluding portion of the specification. The invention, however, may be understood by reference to the following detailed description of non-limiting exemplary embodiments, when read with the accompanying drawings in which:

Figure 1:
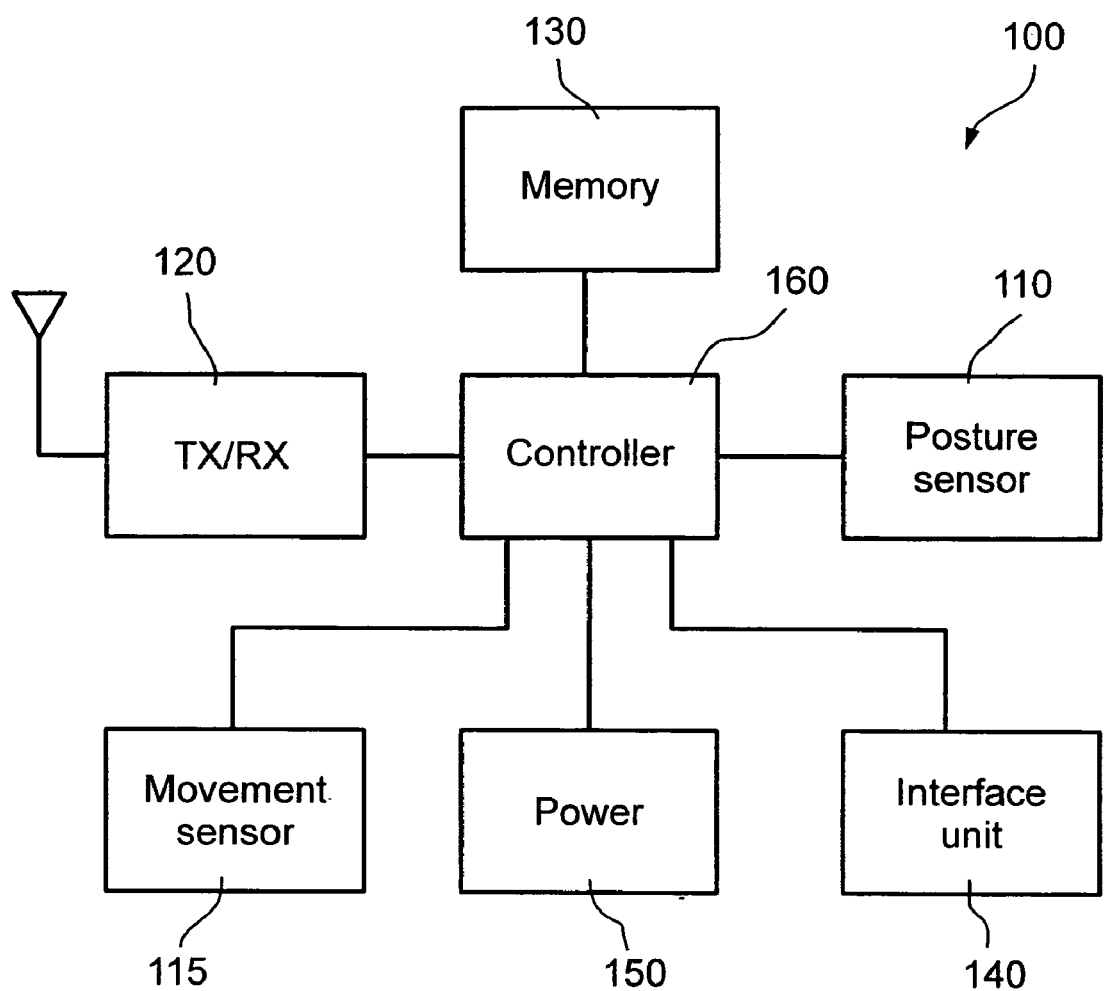
FIG. 1 is an exemplary block diagram of the posture sensing device according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EXEMPLARY EMBODIMENTS

In the following description, exemplary embodiments of the invention incorporating various aspects of the present invention are described. For purposes of explanation, specific configurations and details are set forth in order to provide a thorough understanding of the embodiments. However, it will also be apparent to one skilled in the art that the present invention may be practiced without all the specific details presented herein. Furthermore, well-known features may be omitted or simplified in order not to obscure the present invention. Features shown in one embodiment may be combinable with features shown in other embodiments, even when not specifically stated. Such features are not repeated for clarity of presentation. Furthermore, some unessential features are described in some embodiments.

Reference is now made to FIG. 1 showing an exemplary block diagram of a posture sensing device according to some embodiments of the present invention. According to some embodiments of the present invention, posture sensing device 100 includes posture sensor 110, an optional movement sensor 115, controller 160, optional memory unit 130, power unit 150, and transmission unit 120 optionally including antenna 125. Optionally transmission unit 120 may be a transceiver operative to both transmit and receive signals. Optionally posture sensing device 100 may additionally include an interface unit for relaying information to a user.

According to some embodiments of the present invention, posture sensor 110 may include a tip-over switch to sense a specified inclination and/or change in inclination of posture sensor 110. Typically, tip-over switches are electrical switches that open or short when the switch is tilted from a vertical position. The angle through which the switch (together with the posture sensor) is to tilt before switching is called the operating angle. Typically, tip-over switches are omni-directional so that tilting in any direction from the vertical position may be sensed. Typically, the tip-over switch is a normally open switch. When the posture sensor is maintained in a vertical orientation, the switch is opened. Tilting the posture sensor at and/or above the operating angle serves to close the switch. For example, the switch may output a logical '0', e.g. a voltage level corresponding to a logical '0', when at an angle less than the defined operating angle and may output a logical '1', e.g. a voltage level corresponding to a logical '1', at the defined operating angle and/or above the defined operating angle. In other examples, the switch may be a normally closed switch, where logical '0' corresponds to a tilted orientation and logical '1' corresponds to a vertical orientation. An exemplary off-the-shelf tip-over switch that may be included in posture sensor 110 may be a tip-over switch offered by Comus International based in the USA. Other tip-over or angle sensitive switches may be used.

Figure 2:
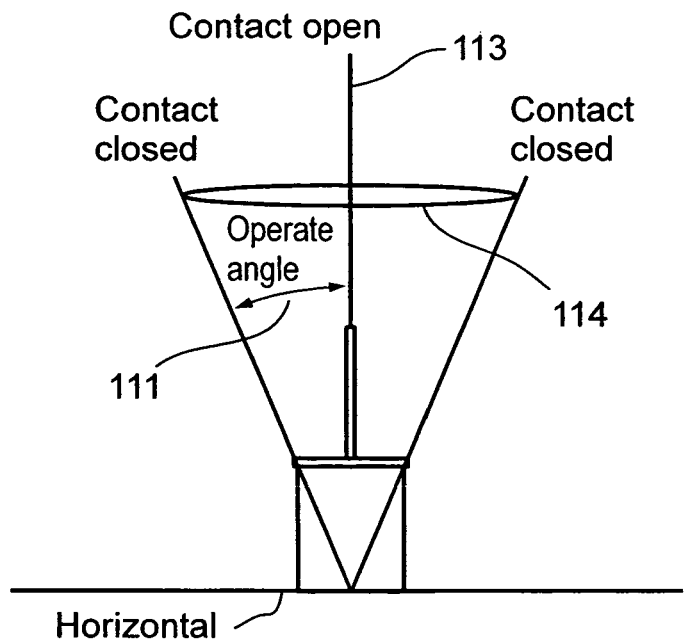
FIG. 2 is an exemplary schematic diagram of the operating angle of a tip-over switch that may be included in the posture sensing device according to some embodiments of the present invention.

Reference is now made to FIG. 2 showing an exemplary schematic diagram of the operating angle of an omni-directional tip-over switch that may be included in the posture sensing device according to some embodiments of the present invention. At vertical position 113, the switch, is open for a normally open switch. At a tilt of operating angle 111 or greater, the switch is closed. Operating angle may be measured in any direction from the vertical position 113, for example, operating angle 111 forms a circular curve 114 from which the switch may be closed. For a normally closed switch, the switch is closed for an angle less than the operating angle and open for a larger angle. According to some embodiments of the present invention, the posture sensing device is positioned on an animal's leg, e.g. the lower part of the animal's leg between the knee and hoof and the operating angle of posture sensor 110 may be set to an angle that may correspond to a tilt of the leg while the animal is in a laying position, e.g. 60° tilt, approximately 60°, and/or between 30° and 80°.

According to some embodiments of the present invention, posture sensor 110, controller 160, optional memory unit 130, power unit 150, and transmission unit 120 optionally including antenna 125 may be embedded and/or included in a housing constructed to be attached to an animal, e.g. constructed to be attached to an animal's leg. The housing may for example be a box with loops for a strap that may be tied to the animal's leg. The housing may be rigidly attached so that the orientation between the housing and the animal's leg may be maintained. According to embodiments of the invention, posture sensor 110 is operative to sense a tilt in the orientation of the part of the animal.

Typically, operation of posture sensor 110 may be controlled by controller 160, e.g. a micro controller. According to some embodiments of the present invention, controller 160 functions to control powering of the posture sensor, for example, with power unit 150, controls sampling of posture sensor data, storing of posture sensing data, for example in memory 130, processing data for interface unit 140 and/or processing data to be transmitted by an output module such as transmitter 120 and/or transmitter 120 and controller 160. According to some embodiments of the present invention, an interrupt is initiated when a change of state occurs, for example, when the switch closes the circuit from an open circuit state and/or when the switch opens the circuit from a closed state. Optionally, controller samples and/or the position sensor may be sampled at any frequency for example 1 Hz. Other sampling rates may be used, e.g. 2 Hz, 5 Hz, 0.5 Hz, 0.2 Hz. Optionally controller 160 may include and/or communicate with an ID tag, e.g. an RF ID tag. Optionally, controller 160 may function to process commands received from a central communication unit, for example, a command to transmit stored tilt information from posture sensing device 100. Request for information transfer may include request to transfer ID information of the animal, number of times the animal sustained a laying position since last information transfer, the total time period that the animal sustained a laying position since last information transfer, posture sensor readings from last information transfer and/or operational state of the posture sensor, e.g. battery level of the posture sensor.

According to an exemplary embodiment of the present invention, controller 160 may include Flash memory e.g. 4 Kbytes and RAM 256 Bytes. Controller may be low powered, and may include a sleep/wake-up function to reduce power consumption.

Power unit 150 may include one or more batteries. In one example, rechargeable batteries are used. Optional memory unit 130 may store data from posture sensor 110, ID data to identify the animal and data to identify the posture sensing device, as well as other information. In some examples, memory unit and/or its functionality is integrated into controller 160. According to other embodiments of the present invention, memory unit 130 may be omitted and one or more counters may be used to store specific information obtained from the posture sensor, e.g. number of laying events, overall time laying posture was maintained, ID tag identifying animal and/or posture sensing device.

In some embodiments of the present invention, transmitter 120 may be an RF transmitter. In some embodiments transmitter 120 may include transmitting and receiving capability. For example, one or more antennas 125 may be used to transmit and/or receive data from, for example a central communication unit. In some examples, transmission and reception may be performed using different frequencies, e.g. 200 KHz and 80 KHz. In other embodiments, transmitter 120 may transmit and/or receive data using other types of transmission, e.g. IR, BlueTooth, hardwire, etc.

According to some embodiments of the present invention, interface unit 140 may include, for example a display, e.g. LCD display, one or more indicating lights, e.g. LED, and/or an audio output, e.g. a beeping sound. Interface unit may relay information to the user, e.g. the dairy manager, regarding the operative state of the device and/or the data sensed.

According to other embodiments of the present invention, posture sensing device 100 may include a plurality of sensors. For example, posture sensing device may include, in addition to posture sensor 110, one or more movement sensors 115, more than one posture sensor, or other sensors. In exemplary embodiments, movement sensor 115 senses animal movements, for example, the number of animal movements and/or steps taken by the animal. Additional sensors may include sensors that sense conditions of the surrounding environment, e.g. temperature sensor to sense ambient temperature. Controller 160 controls transmission of data from the plurality of sensors and control commands received regarding operation of each of the plurality of sensors included in the posture sensing device. Controller 160 may be operative to wake-up the posture sensing device open reception of a request from transmission obtained from a central communication unit. Optional memory 130 may store data from each of the plurality of sensors.

Figure 3:
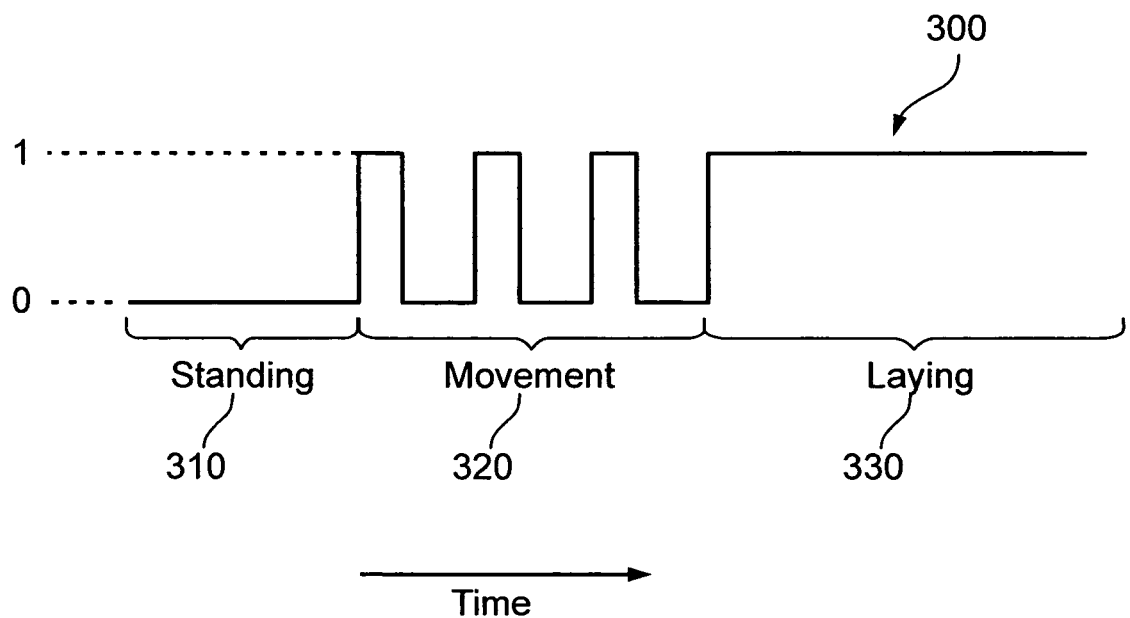
FIG. 3 is an exemplary output signal from a posture sensor included in a posture sensing device according to some embodiments of the present invention.

Reference is now made to FIG. 3 showing an exemplary output signal obtained from the posture sensor over time according to some embodiments of the present invention. According to some embodiments of the present invention, the posture sensing device is positioned on the animal so that a standing posture corresponds to a logical '0' output from the posture sensor included in the posture sensing device while a laying posture corresponds to a logical '1' output from the posture sensor. For example, if the posture sensing device is positioned on a cow's leg, the device may be positioned so that the sensor is approximately vertical with little or no tilt and output a logical '0'. When the cow assumes a laying posture, the sensor, e.g. the sensor on the leg may be tilted above a threshold, e.g. 60° tilt and will read logical '1'. For example, in section 310 the sensor output is logical '0' corresponding to a standing posture. According to some embodiments of the present invention, a standing posture event is defined after the posture sensor reads logical '0' for a period above a pre-defined period, e.g. a period above 1 minute. In section 320, the reading from the posture sensor alternates between logical '0' and logical '1'. This may indicate that the animal is in motion. In some embodiments, the operational angle is set so that there is no switching during ordinary motion of the animal. For example, in section 330 the sensor output may be logical '1' corresponding to a laying posture. According to some embodiments of the present invention, a laying posture event is defined after the posture sensor reads logical '1' for a period above a pre-defined period, e.g. a period above three minutes. According to some embodiments of the present invention, standing posture and/or laying postures are only recorded when the sensor outputs a stable signal for at least a defined period of time, e.g. 1 minute for standing and 3 minutes for laying. Other suitable time periods may be used, e.g. 2 minutes for laying. Readings of logical '0' and/or logical '1' obtained over periods below the defined periods of time may be recorded as a motion event.

Figure 4:
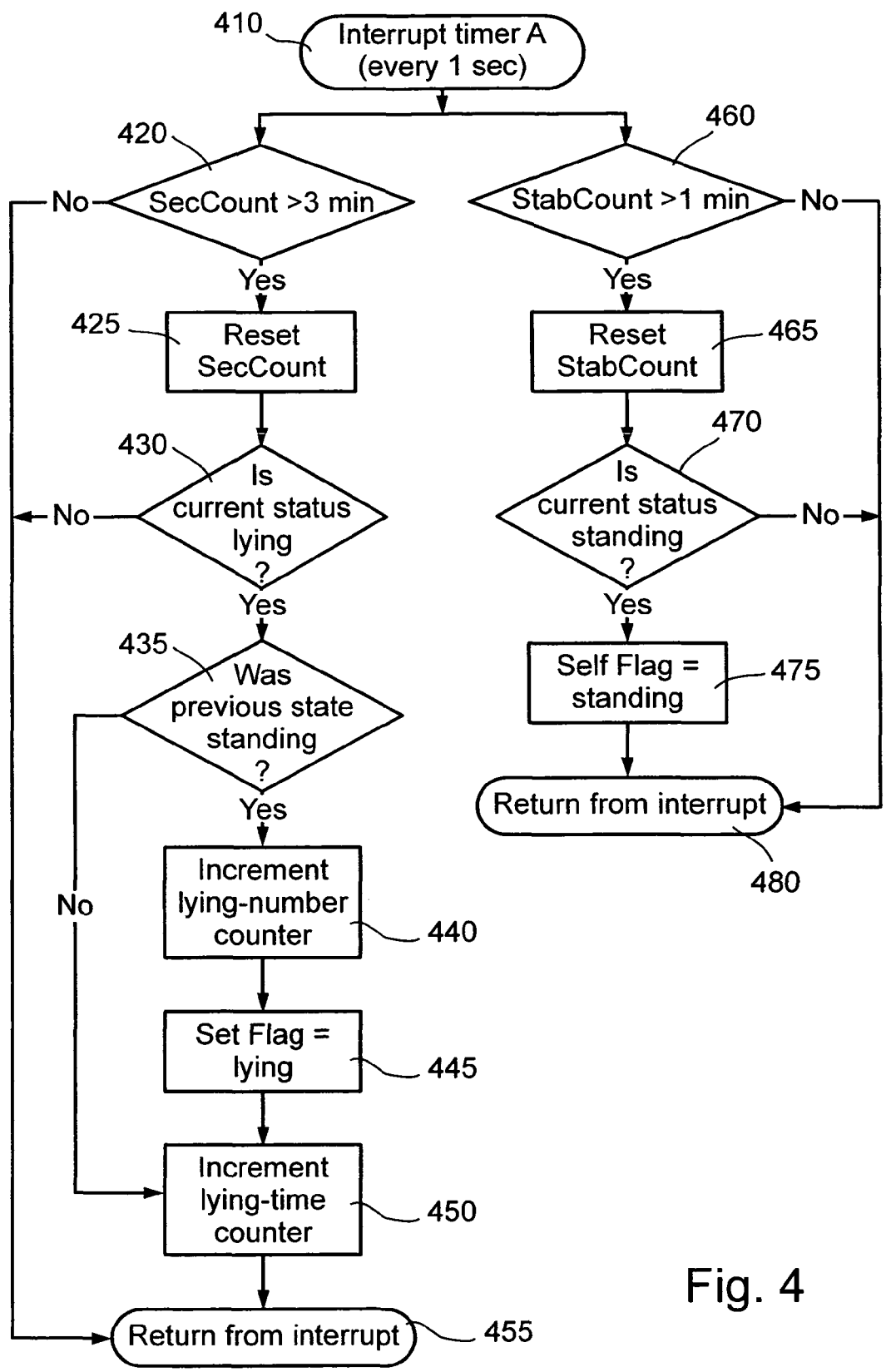
FIG. 4 is an exemplary method for determining a laying posture pattern of an animal according to some embodiments of the present invention.

Reference is now made to FIG. 4 showing an exemplary method for determining a laying posture pattern of an animal according to some embodiments of the present invention. According to some embodiments of the present invention controller 160 samples position sensor 110 once per second, for example by using an interrupt timer set to 1 second (block 410). For a tilt reading, e.g. logical '1' reading the SecCount counter is checked to determine if a pre-defined time period of stable tilt readings, e.g. logical '1' readings has been exceeded (block 420). According to some embodiments of the present invention, the pre-defined time period is three minutes. If the pre-defined time period for SecCount has been exceeded, the SecCount clock is reset (block 425). If the pre-defined time period has not been exceeded there is a return from interrupt (block 455). Once SecCount is reset, a check is made to determine if the current status is a laying posture (block 430). If the current status is not a laying posture, there is a return from interrupt (block 455). If the current status is a laying posture a check is made as to whether a previous status was a standing posture (block 435). If the previous status was not a standing posture, the Lying-Time counter is incremented (block 450) and a return from interrupt is executed (block 450). If the previous state was a standing posture, the Lying-Number counter is incremented (block 440), a flag is set to 'Lying' to indicate that the status is a laying posture (block 445), the Lying-Time Counter is incremented (block 450) and a return from interrupt is executed (block 455).

According to embodiments of the present invention, for a vertical reading, e.g. logical '0' reading a StabCount counter is checked to determine if a pre-defined time period of stable logical '0' readings has been exceed, e.g. 1 minute (block 460). If the time period has not been exceeded, there is a return from interrupt (block 480). Otherwise, if the StabCount threshold period has been exceeded, StabCount counter is reset (block 465) and a check is made to determine if the current status is standing (block 470). If the current status is not standing a return from interrupt is executed (block 480). If the current status is standing, a flag is set to a status of 'Standing' (block 475) and a return from interrupt is executed (block 480).

According to other embodiments of the present invention, logical '1' corresponds to a standing posture while logical '0' corresponds to a laying posture.

According to some embodiments of the present invention SecCount is a time threshold above which a stable reading of logical '0' is recorded as a laying status such that the flag is set to 'Lying'. 'Lying-Number' counter records the number of laying events. "Lying-Time" counter records the overall time period that an animal maintained a laying posture. According to other embodiments of the present inventions, other parameters may be recorded, for example, the time period during each laying event, the actual time each laying event took place, etc. According to some embodiments of the present invention, all parameters, e.g. counters may be reset subsequent to transmission to a central processing unit. According to other embodiments of the present invention, all parameters may be stored in memory 130 after a pre-defined period and reset.

Figure 5:
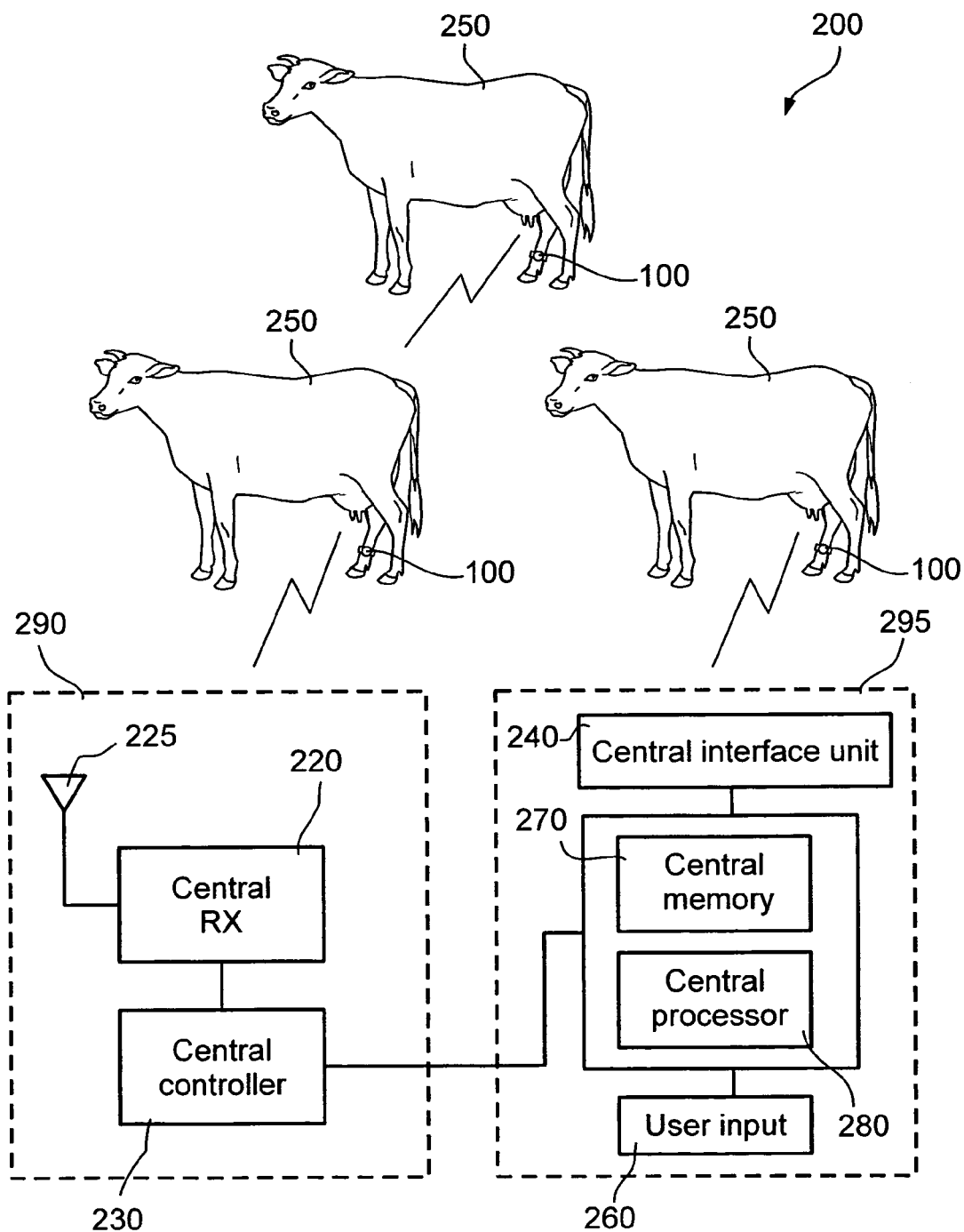
FIG. 5 is an exemplary diagram of the operation of a posture sensing system according to some embodiments of the present invention.

Reference is now made to FIG. 5 shows an exemplary block diagram of a posture sensing system according to some embodiments of the present invention. According to some embodiments of the present invention, posture sensing system 200 may include one or more posture sensing devices 100 each attached to a different animal, e.g. a cow, for example on the foreleg and/or hind leg of the animal. Posture sensing devices transmit to and/or receive data from central communication unit 290 and process the data in a central processing unit 295. According to one embodiment of the present invention, the posture sensing system includes more than one central communication units 290. For example, the posture sensing system includes a plurality of central processing unit connected to central processing unit 295. One or more central communication units 290 may be positioned in strategic and/or designated places in the dairy and/or farm, e.g. in one or more stalls, feeding stations, and/or milking stations, to receive from and/or transmit data to posture sensing devices in different areas where the animals reside. According to some embodiments of the present invention, the central communication unit may be positioned in a passage way through which the cow may pass at least one time a day. For example if a cow is inhabited within an enclosure, food may be positioned at one end of the enclosure and water may be positioned at another end of the enclosure. A passage way, e.g. a narrow passage way may connect one end of the enclosure containing the food to the other end of the enclosure containing the water. As such the cow may pass through the passage way at least once a day and possibly more times a day. According to some embodiments of the present invention, the central communication unit is positioned in the passage way so that the central communication unit may be at close range with the posture sensing device, e.g. approximately 30 cm distance. This may facilitate reading of the posture sensing device while avoiding cross talk with other devices and other communication errors. Other methods of communication between the central communication unit and the posture sensing devices may be implemented.

Central communication unit 290 may include central controller 230, a receiver and/or transceiver 220, e.g. including transmitting and receiving capabilities, and optionally one or more antennas 225. According to some embodiments of the present invention, central controller 230 controls data reception and transmission to and from central processing unit 295 and to and from posture sensing device 100. Transceiver 220 may be, for example, an RF transmitter operative to receive and transmit signals from one or more posture sensing devices. Transceiver 220 may transmit and receive data using different frequencies, e.g. 80 KHz and 200 KHz with same or different antennas. In some embodiments, RF transmitter may be operative to only receive data from one or more posture sensing devices. In other embodiments of the present invention, transceiver 220 may be a different type of transceiver. For example, transceiver 220 may transmit and/or receive data using IR, BlueTooth, and/or hard wiring, e.g. during close range transmission. Other suitable known technologies may be used for transmission and reception of data. According to some embodiments of the present invention, central communication unit may include a user input unit and/or an interface unit. User input unit may allow a user to input commands, via a keyboard, operational buttons, etc. A user interface unit may provide information to the user regarding the operational state of elements of the posture sensing system and/or data received from one or more of the posture sensing devices. User interface unit may include a display, e.g. an LCD display, one or more indicating lights, e.g. LEDs, audio signal, etc. According to some embodiment of the present invention controller 230 may include processing capabilities. According to some embodiments of the present invention, controller 230 may transmit a wake-up command to one or more posture sensing devices and request transmission of data from the posture sensing device. According to some embodiments of the present invention, controller 230 may be included in central processing unit 295 and/or may be separated from the antenna 225 and/or the antenna and transceiver 220 may be positioned near the animals.

According to some embodiments of the present invention, central processor 295 processes and manipulates data received from one or more central processing units 290. Processing by central processing unit 295 may be performed on-line and/or off-line. Central processing unit includes central memory 270, central processor 280, central user input 260, and central interface unit 240. According to some embodiments of the present invention central processing unit may be a standard personal computer with dedicated software such that central interface unit 240 may include a monitor and/or display, central memory 270 and central processor 280 may be included in the personal computer, and user input 260 may include a keyboard. According to other embodiments of the present invention, central interface unit may additionally include an audio alert signal and/or other forms of outputs. Similarly central user input 260 may additionally include dedicated buttons to initiate specific commands. According to some embodiments of the present invention, a user may process data obtained from central communication unit 290. Processing of data may be performed automatically without user intervention and/or by user command. According to some embodiments of the present invention, central processing unit provides information including the laying pattern of one or more animals over a period of time. According to some embodiments of the present invention, central interface unit 240 is operative to alert a user if and when one or more of the animals require attention based on their determined laying pattern. Interface unit 240 is operative to display data corresponding to a laying pattern of the animals. According to some embodiments of the present invention, the central processing unit is operative to perform statistics regarding the laying pattern of one or more animals over time.

It should be further understood that the individual features described hereinabove can be combined in all possible combinations and sub-combinations to produce exemplary embodiments of the invention. The examples given above are exemplary in nature and are not intended to limit the scope of the invention which is defined solely by the following claims.

The terms "include", "comprise" and "have" and their conjugates as used herein mean "including but not necessarily limited to".

The invention claimed is:

1. A device for determining a posture pattern of an animal comprising:
    a housing configured and adapted to be attached to a leg of the animal, the housing comprising:
    a posture sensor operative to sense a tilt in an orientation of the leg of the animal above or below an operating angle indicating the posture of the animal;
    a controller operative to differentiate between a standing posture, a laying posture and a motion event from the sensed orientation and from duration of the sensed orientation and thereby determine the posture pattern, wherein the motion event includes sensed orientations associated with standing that are sustained for less than a first pre-defined duration and sensed orientations associated with laying that are sustained for less than a second pre-defined duration; and
    an interface unit operative to output the posture pattern.

2. The device according to claim 1 wherein the posture sensor includes a tilt switch to sense a tilt in orientation above an operating angle.

3. The device according claim 1 wherein the posture sensor includes an omni-directional tilt switch to sense a tilt in orientation above an operating angle.

4. The device according to claim 1 wherein the posture sensor includes a tip-over switch to sense a tilt in orientation above an operating angle.

5. The device according to claim 1 wherein the operating angle is 60°.

6. The device according to claim 1 comprising:
    the controller, wherein the controller operative to control output from the posture sensor; and
    a transmitter operative to transmit output from the posture sensor to a central communication unit.

7. The device according to claim 6 wherein the controller is operative to initiate an interrupt when the posture sensor senses a change in the orientation.

8. The device according to claim 6 wherein the controller is operative to determine a number of times the animal has assumed a laying posture.

9. The device according to claim 6 wherein the controller is operative to determine an overall time period that the animal has sustained a laying posture.

10. The device according to claim 6 wherein the controller is operative to determine a number of times the animal has assumed a standing posture.

11. The device according to claim 6 wherein the controller is operative to determine an overall time period that the animal has sustained a standing posture.

12. The device according to claim 6 wherein the controller includes an ID tag identifying the animal and is operative to transmit data from the ID tag.

13. The device according to claim 6 wherein the transmitter is an RF transmitter.

14. The device according to claim 6 wherein the transmitter is an IR transmitter.

15. The device according to claim 6 wherein the transmitter is a BlueTooth transmitter.

16. The device according to claim 6 wherein the transmitter includes a receiver to received data from a central communication unit.

17. The device according to claim 16 wherein the receiver is an RF receiver.

18. The device according to claim 1 comprising a memory unit operative to store data from the posture sensor.

19. The device according to claim 1 wherein the posture sensor is operative to determine a time period of a motion event.

20. The device according to claim 1 wherein the interface unit comprises a display.

21. The device according to claim 1 wherein the interface unit comprises audio output.

22. The device according to claim 6 wherein the controller is operative to control transmission of data in response to a wake-up signal received from a central communication unit.

23. A system for determining a posture pattern of animals comprising:
    at least one device according to claim 1; and
    a central processing unit that receives and processes information from the device.

24. The system according to claim 23 and including a central communication unit comprising a central receiver to receive data from one or more devices.

25. The system according to claim 24 wherein the central communication unit includes a central transmitter operative to transmit a signal to the device.

26. The system according to claim 25 wherein the central transmitter is operative to transmit a signal to the device, wherein the signal is operative to wake-up the device.

27. The system according to claim 24 wherein the central receiver is a RF receiver.

28. The system according to claim 24 wherein the central communication unit is configured to communicate with the at least one device at a range of approximately 30 cm or less.

29. The system according to claim 23 wherein the central processing unit comprises:
    a central processor operative to process data received from the at least one device;
    a central memory operative to store data received from the at least one device;
    a central interface unit operative to relay information to a user regarding the data received from the at least one device; and
    a user input operative to input user commands to the central processing unit.

30. The system according to claim 24 wherein the central processing unit includes a personal computer operative to communicate with the central communication unit and to process data received from the central communication unit.

31. The system according to claim 23 comprising a plurality of central communication units in communication with a single central processing unit.

32. The system according to claim 23 wherein the central processing unit comprises a display for displaying data corresponding to a laying pattern of the animals.

33. The system according to claim 1, wherein the first pre-defined duration is shorter than the second pre-defined duration.

34. The system according to claim 1 wherein the second pre-defined duration is at least 2 minutes.

* * * * *